US005736174A

United States Patent [19]
Cooper et al.

[11] Patent Number: 5,736,174
[45] Date of Patent: Apr. 7, 1998

[54] ALKOXYLATED ALCOHOL FAT SUBSTITUTES

[75] Inventors: Charles F. Cooper; Stephen D. Harper, both of Paoli, Pa.

[73] Assignees: Arco Chemical Technology, L.P., Greenville, Del.; CPC International, Inc., Englewood Cliffs, N.J.

[21] Appl. No.: 599,655

[22] Filed: Feb. 9, 1996

Related U.S. Application Data

[63] Continuation of Ser. No. 213,305, Mar. 14, 1994, abandoned.

[51] Int. Cl.$^6$ .................. A23L 1/00; A23D 7/00
[52] U.S. Cl. .................. 426/531; 426/601; 426/602; 426/603; 426/606; 426/607; 426/608; 554/161; 554/227
[58] Field of Search .................. 426/601, 602, 426/603, 606, 607, 608, 611, 531; 554/161–165, 168, 169, 172, 227, 228; 536/18.3

[56] References Cited

U.S. PATENT DOCUMENTS

| | | |
|---|---|---|
| 3,637,869 | 1/1972 | Seizinger . |
| 3,748,276 | 7/1973 | Schmolka . |
| 3,829,506 | 8/1974 | Schmolka et al. . |
| 4,381,205 | 4/1983 | Warchol . |
| 4,398,045 | 8/1983 | Sebag . |
| 4,411,819 | 10/1983 | Panek et al. . |
| 4,479,887 | 10/1984 | Seibert et al. . |
| 4,521,326 | 6/1985 | Seibert et al. . |
| 4,600,523 | 7/1986 | Piorr et al. . |
| 4,649,224 | 3/1987 | Panek et al. . |
| 4,665,239 | 5/1987 | Panek et al. . |
| 4,711,734 | 12/1987 | Fujita et al. . |
| 4,849,242 | 7/1989 | Kershner . |
| 4,861,613 | 8/1989 | White et al. . |
| 4,965,009 | 10/1990 | Baur et al. . |
| 4,971,649 | 11/1990 | Aydia et al. . |
| 4,971,722 | 11/1990 | Philippsen . |
| 5,059,443 | 10/1991 | Ennis et al. . |
| 5,068,119 | 11/1991 | Klemann et al. . |
| 5,077,073 | 12/1991 | Ennis et al. . |
| 5,135,683 | 8/1992 | Cooper . |
| 5,266,346 | 11/1993 | Klemann et al. . |
| 5,494,693 | 2/1996 | Cooper . |

FOREIGN PATENT DOCUMENTS

| | | |
|---|---|---|
| 481523 | 10/1991 | European Pat. Off. . |
| 913094660 | 10/1991 | European Pat. Off. . |
| 2383321 | 4/1982 | Germany . |

OTHER PUBLICATIONS

Ennis et al., HCA 1997 ACS, 115:90975, abstracting EP 415636A2, Mar. 1991.

*Primary Examiner*—Leslie Wong
*Attorney, Agent, or Firm*—Stephen D. Harper

[57] ABSTRACT

Alkoxylated alcohols containing both short and long chain oxyalkylene units are useful as reduced calorie fat substitutes in food compositions. The alkoxylated alcohols provide good organoleptic properties even though not highly esterfied with fatty acid.

14 Claims, No Drawings

ALKOXYLATED ALCOHOL FAT SUBSTITUTES

This application is a continuation of application Ser. No. 08/213,305, filed on Mar. 14, 1994, now abandoned.

FIELD OF THE INVENTION

This invention relates to reduced calorie fat substitutes which are alkoxylated alcohols containing both short and long chain oxyalkylene units. The alkoxylated alcohols are useful as fully functional replacements for edible lipids in the preparation of food compositions having significantly decreased caloric content as compared to analogous compositions prepared using natural fats and oils. In certain embodiments, the alkoxylated alcohols may bear one or more fatty acid acyl groups.

BACKGROUND OF THE INVENTION

The consumption of high levels of triglyceride lipids has been associated with a number of health problems. Currently, obesity is one of the more prevalent metabolic problems among the general population. This condition in many people is attributed to the ingestion of a greater number of calories than is actually needed to supply energy for the maintenance and functioning of the body. Lipids are the most concentrated form of energy in the diet, with each gram of a triglyceride contributing about nine calories.

Maintaining a strict low fat diet, however, is difficult due to the fact that most persons prefer the taste of "rich" foods, that is, foods that have the satisfying mouthfeel associated with fats and oils. In order for a reduced calorie food composition to satisfactorily replace a conventional foodstuff, the fat substitute used in its preparation must mimic as closely as possible the organoleptic qualities of a triglyceride. The fat substitute must additionally have physical properties (viscosity, melting point, heat stability, thermal conductivity, etc.) resembling those of natural lipids since such properties often play a key role during preparation of a food composition. For example, in deep fat frying the oil acts as a heat transfer medium so as to impart crispiness to the food being fried. At the same time, the ideal fat substitute should be non-toxic and should not cause any undesirable gastrointestinal side effects such as anal oil leakage, gas formation or diarrhea. This combination of attributes has in practice been quite difficult to achieve; the need to develop completely acceptable reduced calorie fat substitutes thus still exists.

U.S. Pat. No. 4,861,613 (White et al.) describes synthetic fat-type mimetic ingredients comprising certain esterified epoxide-extended polyols derived from $C_3$–$C_6$ epoxides such as propylene oxide. The esterified epoxide-extended polyol must contain more than two fatty acid acyl moieties. The incorporation of long chain acyl groups, according to this patent, imparts oil-, fat-, grease-, or wax-like physical properties to the epoxide-extended polyol intermediates. Many intermediates of this type such as low molecular weight propoxylated glycerin are known to be water-soluble and non-fatty in character. Such substances thus would perform poorly as fat substitutes in view of the hydrophobic (water-insoluble) nature of triglycerides (e.g., vegetable oils, animal fats).

U.S. Pat. No. 5,077,073 (Ennis et al.) discloses fat substitutes comprised of fatty acid esters of alkoxylated polyols where the polyol is a sugar alcohol or sugar. Each alkoxylated polyol, according to the patent, must be esterified with from 6 to 8 fatty acid groups. The patent states that "[f]atty acid esters of alkoxylated polyols with esterification less than six will begin to have surfactant-type properties making them unsuitable as fat substitutes." It is further taught that each alkoxylated polyol is preferably esterified with 8 fatty acid groups to attain the desired organoleptic character in the alkoxylated sugar or sugar alcohol. U.S. Pat. No. 5,059,443 (Ennis et al.) similarly teaches that alkoxylated alkyl glycosides must be highly esterified with fatty acids to be effective non-caloric fat substitutes.

U.S. Pat. No. 4,849,242 (Kershner) describes the preparation of reduced calorie food compositions using a polymer fatty acid ester derived from a polymeric alcohol and fatty acids. The polymeric alcohol itself is water-soluble or water-dispersible, and thus must be esterified with sufficient fatty acid to effect a change to an oil-like material. Suitable polymeric alcohols are said to be polyoxyalkylenes such as polyoxethylenes, polyoxypropylene, and polyoxybutylenes.

SUMMARY OF THE INVENTION

We have now found that certain alkoxylated alcohols having both short and long chain oxyalkylene units incorporated therein may be directly utilized as reduced calorie fat substitutes without the need to substantially esterify the hydroxyl groups present with fatty acids. This finding was quite unexpected in view of the prior art in the field, which generally teaches that polymeric aliphatic epoxides are too hydrophilic to function as oils or fats.

This invention provides a fat component useful for preparing a reduced calorie food product comprised of an edible triglyceride and an alkoxylated alcohol. The alkoxylated alcohol is comprised of the following structural elements:

(a) an aliphatic hydrocarbyl group bearing n pendant ether oxygen atoms;

(b) from n to 10 times n short chain oxyalkylene units having a structure

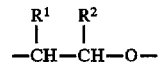

wherein $R^1$ and $R^2$ are the same or different and are selected from hydrogen, $C_2$–$C_4$ alkoxymethyl, and $C_1$–$C_4$ alkyl, subject to the provision that each short chain oxyalkylene unit has a total of no more than 6 carbon atoms;

(c) from n-1 to 5 times n long chain oxyalkylene units having a structure

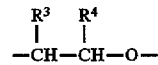

wherein $R^3$ or $R^4$ is selected from $C_{10}$–$C_{22}$ alkyl and $C_{11}$–$C_{25}$ alkoxymethyl;

(d) x terminal fatty acid acyl groups, wherein x is zero or an integer of up to $$\frac{n}{2};$$

and (e) n-x terminal hydrogen atoms;

wherein n is an integer of from 2 to 8 and the aliphatic hydrocarbyl group, short chain oxyalklyene units, and long chain oxyalkylene units are interconnected through ether linkages.

Also provided is an alkoxylated alcohol useful as a reduced calorie fat substitute comprised of:

(a) an aliphatic hydrocarbyl group bearing n pendant ether oxygen atoms;

(b) from n to 10 times n short chain oxyalkylene units having a structure

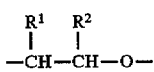

wherein $R^1$ and $R^2$ are the same or different and are selected from hydrogen, $C_2$–$C_4$ alkoxymethyl, and $C_1$–$C_4$ alkyl, subject to the provision that each short chain oxyalkylene unit has a total of no more than 6 carbon atoms;

(c) from n-1 to 5 times n long chain oxyalkylene units having a structure

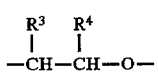

wherein one of $R^3$ or $R^4$ is hydrogen or $C_1$–$C_4$ alkyl and the remaining $R^3$ or $R^4$ is selected from $C_{10}$–$C_{22}$ alkyl and $C_{11}$–$C_{25}$ alkoxymethyl;

(d) x terminal fatty acid acyl groups wherein x is an integer of up to $$\frac{n}{2};$$

and (e) n-x terminal hydrogen atoms;

wherein n is an integer of from 2 to 8 and the aliphatic hydrocarbyl groups, short chain oxyalkylene units, and long chain oxyalkylene units are interconnected through ether linkages.

The present invention also furnishes a reduced calorie food product comprised of at least one non-fat ingredient and a fat component, wherein said fat component is comprised of an alkoxylated alcohol having the structure described hereinabove. Additionally provided is a method of reducing calories in a food products comprised of a fat component, where the method comprises replacing at least 25% by weight of the fat component with any of the aforementioned alkoxylated alcohols.

The alkoxylated alcohol fat substitutes of the invention are obtainable, for example, by a process comprising the steps of:

(a) alkoxylating one equivalent of an alcohol having n hydroxy groups with (i) from n to 10 times n equivalents of a short chain epoxide having a structure

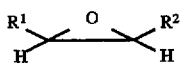

wherein $R^1$ and $R^2$ are the same or different and are selected from hydrogen, $C_2$–$C_4$ alkoxymethyl, and $C_1$–$C_4$ alkyl subject to the provision that the short chain epoxide has a total of no more than 6 carbon atoms and (either at the same time or sequentially) (ii) n-1 to 5 times n equivalents of a long chain epoxide having a structure

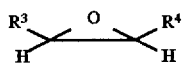

wherein one of $R^3$ or $R^4$ is hydrogen or $C_1$–$C_4$ alkyl and the remaining $R^3$ or $R^4$ is selected from $C_{10}$–$C_{22}$ alkyl and $C_{11}$–$C_{25}$ alkoxymethyl to form an alkoxylated alcohol; and, optionally, (b) reacting the alkoxylated alcohol with a fatty acid entity wherein the number of equivalents of fatty acid entity reacted per equivalent of alkoxylated alcohol is from 1 to $$\frac{n}{2},$$

wherein n is an integer of from 2 to 8.

DETAILED DESCRIPTION OF THE INVENTION

The alkoxylated alcohol fat substitutes of this invention are organic compounds comprised of at least the following four types of covalently bonded moieties: (1) aliphatic hydrocarbyl groups, (2) short chain oxyalkylene units, (3) long chain oxyalkylene units and (4) terminal hydrogen atoms. Optionally, the terminal hydrogen atoms may be partially replaced with terminal fatty acid acyl groups.

Each aliphatic hydrocarbyl group, which will have n ether oxygen atoms pendant to it, corresponds to the generic formula $R(O)_n$ and is derived from an alcohol or an alcohol equivalent wherein the alcohol contains two or more hydroxyl groups. R in the foregoing formula thus is an organic moiety such as a hydrocarbyl group containing at least two carbon atoms, hydrogen, and optionally, other elements such as oxygen or nitrogen. The number of hydroxyl groups on the alcohol (n) is most suitably from 2 to 8. The alcohol (which preferably contains primary and/or secondary hydroxyl groups) may be selected from $C_2$–$C_{12}$ aliphatic diols (e.g., propylene glycol, ethylene glycol, 2,3-butanediol, 1,4-butanediol, 2-methyl -1,3-propanediol, neopentyl glycol, 1,3-propanediol, 1,2-cyclohexanediol, 1,5-pentanediol, 2,4-pentanediol, diethylene glycol, dipropylene glycol, 1,6-hexanediol, 2-methyl-2,4 pentanediol, 2-ethyl 1-2-methyl-1,3-propanediol, including those compounds corresponding to the formula $C_nH_{2n}(OH)_2$ wherein n is from 2 to 12) $C_3$–$C_{12}$ aliphatic triols (e.g., glycerol, 1,2,4-butanetriol, 2,3,4-pentanetriol, 2-ethyl-2-(hydroxymethyl) ethane, 1,2,6-trihydroxyhexane, 1,2,3-heptanetriol, and the like), $C_4$–$C_{12}$ aliphatic tetrols (e.g., 2,3,4,5-hexanetetrol, sorbitan, erythritol, pentaerythritoi), $C_5$–$C_{12}$ sugar alcohols [including those compounds corresponding to the formula $HOCH_2(CHOH)_nCH_2OH$ wherein n is 3 to 6 such as xylitol, sorbitol, arabitol, mannitol, and the like], monosaccharides (e.g., erythrose, threose, ribose, arabinose, xylose, lyxose, altrose, glucose, mannose, gulose, idose, galactose, fructose, galactose, and the like), disaccharides (e.g., sucrose, lactose, maltose) and alkyl glycoside molecules wherein the alkyl glycoside is an acetal formed by interaction of a $C_1$–$C_{20}$ alcohol with a carbonyl group of a mono- or disaccharide such as glucose). Also suitable for use as the alcohol are hydroxy-containing substances such as tetrahydrofuran oligomers, oxetane oligomers, sorbitol oligomers, glycerol oligomers, and the like.

In a preferred embodiment, the alcohol is glycerin so as to provide an aliphatic hydrocarbyl group having the structure

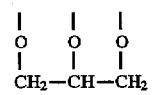

in the linked esterified alkoxylated polyol (i.e., $R=C_3H_5$ and n=3 in the foregoing formula). Glycerin may be readily and economically obtained by hydrolytic splitting of a natural triglyceride. The fatty acids obtained in such a splitting operation may also be utilized in the preparation of the alkoxylated alcohol.

The short chain oxyalkylene units which are present each contain a total of no more than 6 carbon atoms and correspond to the structure

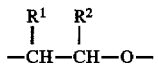

wherein $R^1$ and $R^2$ are the same or different and are selected from hydrogen, $C_2$–$C_4$ alkoxymethyl, and $C_1$–$C_4$ alkyl. The short chain oxyalkylene units may be derived by ring-opening of an epoxide or an equivalent thereof. Epoxides suitable for use include $C_2$–$C_6$ aliphatic epoxides such as ethylene oxide, propylene oxide, 1,2 butene oxide, 2,3-butene oxide, 1,2-pentene oxide, 1,2-hexene oxide, methyl glycidyl ether, ethyl glycidyl ether, propyl glycidyl ether, allyl glycidyl ether and the like. Different types of short chain oxyalkylene units may be contained within the same alkoxylated alcohol molecule. For example, mixtures of ethylene oxide and propylene oxide or propylene oxide and 1,2-butene oxide may be utilized. The number of short chain oxyalkylene units must be at least n but no greater than 10 times n, with n being an integer of from 2 to 8. Where n=3, for instance, the preferred number of such units is from 3 to 30. Preferably, there are no more than 5 times n short chain oxyalkylene units per molecule of alkoxylated polyol.

Also required in the alkoxylated alcohol fat substitute is the presence of at least n-1 to no more than 5 times n long chain oxyalkylene units. Such units will preferably have the general structure

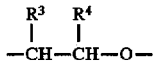

wherein one of $R^3$ or $R^4$ is hydrogen or $C_1$–$C_4$ alkyl and the remaining $R^3$ or $R^4$ is selected from $C_{10}$–$C_{22}$ alkyl and $C_{11}$–$C_{25}$ alkoxymethyl. Preferably, $R^3$ and $R^4$ are linear (unbranched). The long chain oxyalkylene units may be conveniently obtained by ring-opening of epoxides possessing long chain alkyl groups. Epoxides suitable for use include those corresponding to the structure

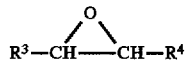

wherein $R^3$ and $R^4$ have the identities disclosed hereinabove. Illustrative examples of such epoxides are as follows: 1,2-dodecene oxide, 1,2-tetradecene oxide (tetradecylene oxide), 1,2-hexadecene oxide (hexadecylene oxide), 1,2-octadecylene oxide (octadecylene oxide), 1,2-eicosene oxide (eicosylene oxide), 1,2-docosene oxide, 1,2-tetracosene, octyl glycidyl ether, decyl glycidyl ether, dodecyl glycidyl ether, tetradecyl glycidyl ether, hexadecyl glycidyl ether octadecyl glycidyl ether, pentadecylene oxide, heptadecylene oxide, nonadecylene oxide, tridecylene oxide, 2,3-decylene oxide, 3,4-decylene oxide, 4,5-decylene oxide, 5,6-decylene oxide, 2,3-dodecylene oxide, 2-methyl dodecyl glycidyl ether, oleyl glycidyl ether, and the like. Preferred long chain epoxides include those comprising the structure

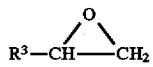

wherein $R^3$ is a $C_{10}$–$C_{22}$ linear alkyl group or

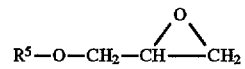

wherein $R^5$ is a $C_{10}$–$C_{24}$ linear alkyl group.

Also present in the alkoxylated alcohol are n-x terminal hydrogen atoms (—H) and/or x terminal fatty acid acyl groups

wherein n is an integer of from 2 to 8 and x is zero or an integer of up to

"Terminal" in this context means that the group is monovalent in character and is thus attached to only one other moiety within the alkoxylated alcohol molecule. The other moiety to which the terminal hydrogen atom(s) or fatty acid acyl group(s) is (are) attached may be the aliphatic hydrocarbyl group (through a pendant ether oxygen atom) or, more preferably, a short chain or long chain oxyalkylene unit. The terminal fatty acid acyl group may have a structure

wherein R is a $C_5$–$C_{23}$ aliphatic moiety (linear, branched, saturated, unsaturated). Such fatty acid acyl groups may be conveniently, derived from one or more fatty acids or equivalents thereof such as those obtained by splitting (hydrolysis) of the triglycerides found in animal or vegetable lipids. Illustrative fatty acids include, but are not limited to, eicosanoic, (arachidic) acid, heneicosanoic acid, docosanoic (behenic) acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, paimitoleic acid, gadoleic acid, erucic acid, ricinoleic acid, linoleic acid, linolenic acid, myristoleic acid, eleostearic acid, elaidic acid, arachidonic acid, or mixtures of these acids.

The alkoxylated alcohol thus can be partially esterified and, in one preferred embodiment, contains at least one fatty acid acyl group. No more than half the available hydroxyl groups of the alkoxylated alcohol are esterified, however. For example, where a triol such as glycerol is utilized as the alcohol (i.e., the source of the aliphatic hydrocarbyl group) and n=3, there may be two or three terminal hydrogen atoms and (at most) one fatty acid acyl group (i.e., x=zero or 1). Similarly, where the alcohol is a sugar alcohol such as sorbitol, the alkoxylated alcohol may contain anywhere from 3 to 6 terminal hydrogen atoms but no more than 3 fatty acid acyl groups. It has been unexpectedly discovered that a high degree of esterification is not required to attain satisfactory fat-like properties in the alkoxylated alcohol or to achieve a molecular weight sufficiently great to prevent direct absorption upon ingestion. However, the introduction of a limited number of fatty acid acyl groups may enable the various characteristics of the alkoxylated alcohol fat substitute to be optimized or tailored to meet the particular requirements of certain food formulations or compositions.

Partial esterification, for example, may be used to advantage so as to provide a reduced calorie fat substitute which possesses the organoleptic and physical properties of a conventional edible oil or fat yet has reduced tendency to cause the undesirable gastrointestinal side effects such as anal oil leakage associated with certain known fat substitutes. For instance, an alkoxylated alcohol may be selected which is water-soluble, water-dispersible, emulsifiable, and/or capable of functioning as an emulsifier, thickener, or gelling agent. Partial esterification with fatty acid is then performed to yield a substance which is more fat-like in character. Upon ingestion as part of a reduced calorie food composition, at least partial hydrolysis or other breakdown of the partially esterified alkoxylated alcohol takes place such that the digested fat substitute has a substantially reduced tendency to separate as a discrete oil phase from the excreted fecal matter, thereby alleviating anal leakage problems. Similarly, the fatty acids could be chosen such that they lower the melting point of the alkoxylated alcohol, thereby converting it from a solid fat to a liquid oil. The partially esterified alkoxylated alcohol, as a liquid oil, could be used in a wide variety of food compositions (e.g., salad dressings, mayonnaise) wherein a liquid vegetable oil is conventionally employed for palatability reasons. When consumed, however, a sufficient number of fatty acid acyl groups are removed such that the fat substitute again assumes solid or partially solid form and thus exhibits less anal oil leakage.

The alkoxylated alcohols of this invention thus include those compounds having the general structure

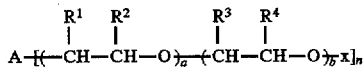

wherein A represents the aliphatic hydrocarbyl group bearing n pendant ether oxygen atoms, $R^1$ and $R^2$ are the same or different and are selected from hydrogen, $C_2$–$C_4$ alkoxymethyl, and $C_1$–$C_4$ alkyl (subject to the provision that each

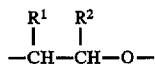

contains no more than 6 carbon atoms), one of $R^3$ or $R^4$ is hydrogen or $C_1$–$C_4$ alkyl and the remaining $R^3$ or $R^4$ is selected from $C_{10}$–$C_{22}$ alkyl and $C_{11}$–$C_{25}$ alkoxymethyl, n is an integer of from 2 to 8, x is —H or

with $R^5$ being a $C_5$–$C_{22}$ aliphatic moiety and the number of

groups being no more than the number of —H groups, the value of a being selected such that the total number of short chain oxyalkylene units in the alkoxylated alcohol molecule is from n to 10 times n, and the value of b being selected such that the total number of long chain oxyalkylene units in the alkoxylated alcohol molecule is from n-1 to 5 times n.

In one desirable embodiment of the invention, it is preferred that the sum of the number of long chain oxyalkylene units and the number of fatty acid acyl groups in the alkoxylated alcohol be equal to or greater than the value of n. In another embodiment, the sum of the number of long chain oxyalkylene units and the number of fatty acid acyl groups is no less than ⅓ the number of short chain oxyalkylene units. In order for the alkoxylated alcohol to have satisfactory fat-like properties, it is critical that the relative proportions of short chain oxyalkylene units, long chain oxyalkylene units, and fatty acid acyl groups be selected such that the resulting alkoxylated alcohol is substantially insoluble in water (i.e., the maximum possible concentration of the alkoxylated alcohol which can be dissolved in water at 20° C. is 1 weight %).

Although the short and long chain oxyalkylene units may be arranged in any manner within the alkoxylated alcohol, i.e., in either a random or block configuration relative to each other, in a preferred embodiment the short chain oxyalkylene units are located internally within the alkoxylated alcohol. That is, such units are placed adjacent to the aliphatic hydrocarbyl group rather than the terminal hydrogen atoms or fatty acid acyl groups. Where a in the foregoing formula is greater than 1, it is preferred for the multiple short chain oxyalkylene units to be connected to each other in sequence so as to form a block-type structure. At the same time, in this preferred embodiment the long chain oxyalkylene units will be located in positions closer to the terminal x groups to form, in effect, a "cap" on the alcohol which has been alkoxylated with short chain epoxide.

Alkoxylated alcohols suitable for use in fat substitutes in accordance with the present invention may be readily and conveniently prepared by adaptation of conventional alkoxylation and esterification methods. For example, one equivalent of an alcohol having n hydroxyl groups may be alkoxylated with from n to 10 times n equivalents of a short chain epoxide and from n-1 to 5 times n equivalents of a long chain epoxide. The alkoxylation may be performed sequentially wherein one type of epoxide is reacted first with the alcohol followed by reaction with the other type of epoxide or, alternatively, the alcohol is reacted with a mixture of both short and long chain epoxides. Any substance capable of accelerating the ring-opening addition of the epoxides onto the alcohol may be utilized as a catalyst in the alkoxylation, including acidic, basic, and coordination catalysts. Such alkoxylation techniques are well-known and are described, for example in U.S. Pat. Nos. 3,637,869 (Seizinger), 3,748, 276 (Schmolka), 3,829,506 (Schmolka et al.), 4,381,205 (Warchol), 4,398,045 (Sebog), 4,411,819 (Panek et al.), 4,479,887 (Seibert), 4,521,326 (Seibert), 4,600,523 (Piorr et al.), 4,649,224 (Panek et al), 4,665,239 (Panek et al), 4,711, 734 (Fujita et al.), 4,965,009 (Baur et al.), 4,971,649 (Aydin et al.), and 4,971,722 (Philippsen), and WO 84/00361 (the teachings of the publications are incorporated herein by reference in their entity).

Partial esterification of the alkoxylated alcohol, if desired, may be accomplished using any suitable method known for synthetic transformations of this type. For example, a fatty acid or mixture of fatty acids may be reacted with the alkoxylated alcohol to yield the partially esterified alkoxylated alcohol and water as a co-product. A catalyst may be used to accelerate the reaction, preferably an acidic catalyst such as a mineral acid (sulfuric acid, for example) or a sulphonic acid (p-toluene sulphonic acid, for example). The water co-product may be removed continuously from the reaction mixture using a method such as azeotropic distillation, sparging, or vacuum distillation in order to drive the reaction to the desired degree of completion. Alternatively, a transesterification reaction may be employed wherein a fatty acid ester

or mixture of fatty acid esters is reacted with the alkoxylated alcohol. Preferably, the fatty acid ester is an ester of a $C_1$–$C_4$ alcohol such as methanol or ethanol. The low boiling alcohol formed as a co-product may be removed from the transesterification reaction mixture in order to drive the equilibrium reaction in the desired direction. A catalyst such as an acidic or basic catalyst may be used in the transesterification. In yet another approach, the alkoxylated alcohol may be reached with an acid halide derivative of one or more fatty acids

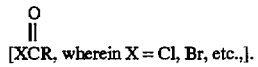

Alternatively, a fatty acid anhydride such as stearic anhydride could be utilized. Methods of accomplishing esterification of alcohols using various fatty acid-based reactants are well known in the field and are described, for example, in Markley, "Esters and Esterification," in *Fatty Acids*, Markley, ed., 2nd edition, Part 2, Chapter IX, pp. 757–984 (1961).

The alkoxylated alcohol and the fatty acid compound are reacted for a time and at a temperature sufficient to accomplish partial esterification of the hydroxyl groups of the alkoxylated alcohol. One of the important advantages of the present invention is that complete or nearly complete esterification of all available hydroxyl groups is not necessary in order to obtain a product having fat-like qualities. Substantially complete esterification is often quite difficult to achieve in practice, particularly when the hydroxyl groups being esterified are sterically hindered. The difficulties associated with synthesizing sucrose octaester fat substitutes (olestra) are well-known, for example.

To minimize direct absorption of the fat substitute through the walls of the gastrointestinal tract, it is highly advantageous for the molecular weight of the alkoxylated alcohol to be at least 750 (more preferably, at least 900). To avoid undesirably high viscosities when the alkoxylated alcohol is in melted or liquid form, the molecular weight generally should be no greater than 6000 and preferably is 3000 or less.

Alkoxylated alcohol fat substitutes will deliver less than 9 Kcal/gram, preferably less than 5 Kcal/gram, and, in some embodiments, less than 3 Kcal/gram, upon being metabolized by the human body. Where a maximum reduction in the calorie content of a food composition is desired, the alkoxylated alcohol may be selected such that it delivers essentially 0 Kcal/gram when consumed.

A reduced calorie fat substitute produced by the methods described hereinabove can be additionally purified or treated so as to render it more suitable for use in food compositions using any of the techniques known in the art for refining natural vegetable or animal lipids or other synthetic fat substitutes. Such techniques include, but are not limited to, degumming, bleaching, filtration, deodorization, hydrogenation, dewaxing, and the like. Various additives such as stabilizers, anti-oxidants (e.g., tocopherols, hindered phenols such as BHT, and hydroquinones such as TBHQ), vitamins (e.g., fat-soluble vitamins such as vitamin A, D, E, and K) and so forth can also be incorporated into the alkoxylated alcohol.

It should be understood that by the nature of the chemical reactions used to prepare the alkoxylated alcohols, the products obtained will typically be mixtures of individual compounds which have a range of molecular weights and which may contain different structural isomers. It may be useful to deliberately blend individually prepared alkoxylated alcohols having different molecular weights, different proportions of short and long chain oxyalkylene units, different functionality, different degrees of esterification, and/or different fatty acid acyl groups in order to obtain fat mimetics having certain desired properties.

The alkoxylated alcohols may be used as partial or total (100%) replacements for triglyceride lipids in any edible fat-containing food composition. The amount of the fat mimetic is sufficient to effectively reduce the available calories of the food composition as compared to a food composition prepared using an equivalent amount (weight or volume) of a triglyceride lipid. Preferably, at least about 10 percent (more preferably, at least about 25 percent by weight) of the total fat-like component of the food composition is comprised of the alkoxylated alcohol.

The triglyceride admixed with the alkoxylated alcohol may be any of the known edible fatty acid triglycerides available from natural or synthetic sources. These edible fatty acid triglycerides include, but are not limited to, fats and oils such as tallow, soybean oil, cottonseed oil, coconut oil, palm kernel oil, corn oil, fish oil, lard, butter fat, olive oil, palm oil, peanut oil, safflower seed oil, cocoa butter, sesame seed oil, rapeseed oil, sunflower see oil, as well as fully partially hydrogenated derivatives and mixtures of these triglycerides. While the alkoxylated alcohol may be combined in any proportion with the triglyceride, weight ratios of from 5:95 to 95:5 are particularly advantageous. The triglyceride may be selected so as to impart a desirable caloric content, flavor, aroma, mouthfeel, thermal stability, viscosity, rheology (Newtonian or non-Newtonian) or other property to the blend and to the resulting food composition.

The physical, organoleptic, and physiological properties and characteristics of the alkoxylated alcohol may be controlled as desired by varying the identifies and relative proportions of the oxyalkylene units and fatty acids incorporated therein. The composition of the alkoxylated alcohol may thus be readily altered so as to render the fat substitute completely liquid, completely solid, or partially liquid and partially solid at room temperature (i.e., the solid fat index may range from 0 to 100%). In certain preferred embodiments, the solid fat index at room temperature (21° C.) as measured by dilatometry is greater than 50. In other preferred embodiments (such as, for example, where minimal anal oil leakage is desired), the solid fat index at 27° C. is greater than 30, more preferably greater than 40.

The alkoxylated alcohol fat substitute can replace, in full or in part, a triglyceride lipid in a cooking oil, frying oil, salad oil, or shortening, for example. Additional uses include combining the alkoxylated alcohol with other foodstuff ingredients to form food products such as frozen desserts (e.g., sherbet, ice cream, frozen yogurt, milk shakes), baked goods (cakes, doughnuts, muffins, brownies, breads, pies, rolls, pastries, cookies, biscuits, crackers), nut butters (peanut butter), dairy products (margarine, sour cream, coffee lighteners, cheese, cheese spreads, flavored dips, filled cream, filled milk), mayonnaise, salad dressing, savory snacks (potato chips, corn chips, cheese puffs, pretzels), fried foods (fried poultry, fritters, fried pies, fried vegetables such as french fried potatoes, fried fish), reformed and comminuted meats (lunch meats, sausage, hot dogs, hamburger), pet foods, meat and egg substitutes or extenders, whipped toppings, gravies and other sauces, frostings, fillings, icings, cocoa butter replacements or blends, candies and confectioneries (especially those normally containing fatty ingredients such as chocolate or peanut butter), soups and dry baking mixes (for muffins, cakes, pancakes, waffles, brownies, and the like). Owing to the fat-like properties and stability of the alkoxylated alcohol, minimum reformulation of standard food compositions will generally be required. The viscosity, melting profile, plasticity, and other physical properties of the alkoxylated polyol are preferably selected such that they mimic as closely as possible the analogous properties of the conventional triglyceride being replaced.

Illustrative ingredients (including both fatty food ingredients and non-fat food ingredients) which may be used in combination with the alkoxylated alcohol fat mimetics include carbohydrates (flour, starches, sugars, celluloses), edible lipids (triglycerides), proteins (from animal or vegetable sources), vitamins (including, but not limited to, fat soluble vitamins such as vitamin A, vitamin D, vitamin E, and vitamin K), antioxidants, emulsifiers (including, but not limited to, the emulsifiers listed as approved for food use in the United States Code of Federal Regulations), thickeners, preservatives, colorants, flavors, fragrances, sugar substitutes (saccharin, aspartame, sucralose, cyclamates, and the like), other fat substitutes or fat mimetics (for example, polyol polyesters such as sucrose polyester, other esterified alkoxylated polyols such as esterified propoxylated glycerin, or caprenin), bulking agents such as polydextrose, dietary fibers, water, milk, spices, eggs and the like. Oil-in-water or water-in-oil emulsions can be readily prepared by combining water, the alkoxylated alcohol, and (optionally) other ingredients such as emulsifiers. The alkoxylated alcohols are particularly suitable for the preparation of food compositions requiring exposure to elevated temperatures. Unlike other proposed fat substitutes such as proteinaceous macrocolloids or certain polysaccharide-based substances requiring water to render them fat-like in texture, the fat mimetics of this invention are thermally stable and do not readily decompose or lose their fat-like properties when heated. The fat mimetics thus may readily be utilized in deep fat frying applications to prepare fried foods such as savory snacks (e.g., potato chips), fried chicken, fried fish, french fries, and the like since they will function as effective heat transfer media (that is, they will transmit heat rapidly and uniformly to the food being fried and also providing crisping).

From the foregoing description, one skilled in the art can readily ascertain the essential characteristics of this invention and make various changes and modifications of the invention to adapt it to various usages, conditions, and embodiments.

The following examples further illustrate the compositions of this invention, but are not limitative to the invention in any manner whatsoever.

EXAMPLE 1

This example demonstrates the synthesis of an alkoxylated alcohol reduced calorie fat substitute useful in the practice of the present invention.

Propoxylated glycerin (92 parts by weight) is prepared by charging glycerin into a clean, dry pressure vessel equipped for high pressure alkoxylation. Thereafter, 15% by weight of flaked 90% potassium hydroxide (14.8 parts) is added to the glycerin and the mixture heated at 115° C. for a period of about one to three hours. Thereafter, a vacuum is applied to the mixture to strip off any water. After the vacuum is released and the vessel has been pressurized with nitrogen to 15 psig, propylene oxide (290 parts) is charged, under pressure, into the vessel and reacted with the material contained therein at 115° C. for two to three hours or until at least 95% conversion of the propylene oxide has been attained.

Thereafter, 1,2-epoxyoctadecane (385 parts) is added to the vessel with stirring and heating at 125° C. to 135° C. continued for another three hours or until at least 95% of the 1,2-epoxyoctadecane has reacted. The resulting product is treated with magnesium silicate (5% by weight) and water (1% by weight), heated at 120° C. for two hours, and filtered to remove residual potassium catalyst. Residual volatiles are removed by steam vacuum distillation (200°–205° C., 10 mm Hg vacuum, 3 parts water per part alkoxylated alcohol) to yield an alkoxylated alcohol containing an average of about 5 equivalents of reacted propylene oxide and 3 equivalents of reacted 1,2-epoxyoctadecane per equivalent of glycerin.

EXAMPLE 2

This example demonstrates the preparation of a partially esterified alkoxylated alcohol fat substitute in accordance with the present invention.

An alkoxylated alcohol is prepared following the procedure of Example 1, then (prior to steam vacuum distillation) combined with a mixture of stearic acid (142 parts) and oleic acid (141 parts) and heated at 200° C. at a pressure of 10 mm Hg for 12 hours or until at least 95% reaction of the fatty acids has been achieved. Vacuum steam distillation as described in Example 1 is then utilized to remove residual volatiles and unreacted fatty acids, thereby providing a purified partially esterified alkoxylated alcohol containing about one fatty acid acyl group per equivalent of glycerin.

EXAMPLE 3

The preparation of reduced calorie potato chips using the fat substitutes of this invention is demonstrated in this example.

A quantity of each of the following frying compositions sufficient to safely fill a 5 pound batch fryer is heated to a temperature of 365° F. (185° C.). Norchip potatoes which have been sliced to a uniform thickness of about 0.052 inches (0.13 cm) are then submerged in the heated frying composition until the sliced potatoes attain the desired degree of crispness or moisture content.

The potato chips thus produced are then drained and salted. As a consequence of utilizing an alkoxylated alcohol as a component of the frying composition, the available caloric value of the chips is significantly decreased relative to chips cooked in peanut or soybean oil above.

| Frying Composition | Component | % by Weight |
| --- | --- | --- |
| A | Example 1 Alkoxylated Alcohol | 100 |
| B | Example 1 Alkoxylated Alcohol | 67 |
|   | Peanut Oil | 33 |
| C | Example 2 Alkoxylated Alcohol | 100 |
| D | Example 2 Alkoxylated Alcohol | 50 |
|   | Soybean Oil | 50 |

EXAMPLES 4–11

Other specific embodiments of the invention are illustrated in Table 1 wherein various alkoxylated alcohol reduced calorie fat substitutes are prepared using different alcohols, short chain epoxides, long chain epoxides, and fatty acids and containing varying proportions of such reactants.

TABLE I

| Example | Alcohol | Short Chain Epoxide | equiv./equiv. Alcohol | Long Chain Epoxide | equiv./equiv. Alcohol | Method of Epoxide Addition | Fatty Acid | equiv./equiv. Alcohol |
|---|---|---|---|---|---|---|---|---|
| 4 | sorbitol | ethylene oxide | 8 | octadecyl glycidyl ether | 10 | A[7] | Soybean oil fatty acids | 3 |
| 5 | 2,3-butanediol | 1,2-butene oxide | 2 | $C_{14}$–$C_{18}$ epoxide mixture[3] | 4 | B[8] | none | — |
| 6 | 2,3,4-pentane triol | PO/EO[1] | 9 | eicosylene oxide | 9 | C[9] | hydrogenated high erucic acid rapeseed oil fatty acids | 1 |
| 7 | trimethylol propane | PO/BO[2] | 12 | $C_{11}$–$C_{14}$ epoxide mixture[4] | 2 | A | palmitic acid | 1 |
| 8 | sorbitan | ethyl glycidyl ether | 6 | hexadecyl glycidyl ether | 6 | B | coconut oil fatty acids | 2 |
| 9 | tripropylene glycol | propylene oxide | 14 | tetradecylene oxide | 12 | C | none | — |
| 10 | sucrose | propylene oxide[10] | 8 | $C_{15}$–$C_{18}$ epoxide mixture[5] | 8 | A | none | — |
| 11 | pentaerythritol | propylene oxide | 4 | $C_{14}$–$C_{16}$ epoxide mixture[6] | 8 | B | partially hydrogenated cottonseed oil fatty acids | 2 |

[1] mixture of propylene oxide and ethylene oxide (2:1 molar ratio)
[2] mixture of propylene oxide and 1,2-butene oxide (1:1 molar ratio)
[3] mixture of 1,2-tetradecene oxide, 1,2-hexadecene oxide, and 1,2-octadecene oxide (1:1:1 molar ratio)
[4] commercial mixture of $C_{11}$–$C_{14}$ 1,2-alkylene oxides having an average molecular weight of about 210
[5] mixture of alpha-olefin oxides having chain lengths of from about 15 to 18 carbon atoms sold under the trademark "Vikolox 15–18" by Elf Atochem
[6] mixture of alpha-olefin oxides having chain lengths of from about 14 to 16 carbon atoms sold under the trademark "Vikolox 14–16" by Elf Atochem
[7] short chain epoxide reacted first with alcohol, followed by long chain epoxide
[8] short and long chain epoxides reacted simultaneously with alcohol
[9] long chain epoxide reacted first with alcohol, followed by short chain epoxide
[10] sucrose is alkoxylated with propylene oxide following the procedure described in U.S. Pat. No. 2,908,681 (Anderson et al.)

We claim:

1. A fat component useful for preparing a reduced calorie food product, said fat component comprising (i) an edible triglyceride and (ii) an alkoxylated alcohol comprised of:

(a) an aliphatic hydrocarbyl group bearing n pendant ether oxygen atoms wherein said aliphatic hydrocarbyl group is derived from an alcohol having n hydroxy groups;

(b) from n to 10 times n short chain oxyalkylene units having a structure

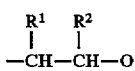

wherein $R^1$ and $R^2$ are the same or different and are selected from hydrogen, and $C_1$–$C_4$ alkyl, subject to the provision that each short chain oxyalkylene unit has a total of no more than 6 carbon atoms;

(c) from n-1 to 5 times n long chain oxyalkylene units having a structure

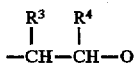

wherein one of $R^3$ or $R^4$ is hydrogen or $C_1$–$C_4$ alkyl and the remaining $R^3$ and $R^4$ is selected from $C_{10}$–$C_{22}$ alkyl and said long chain oxyalkylene units are derived from one or more long chain epoxides of structure

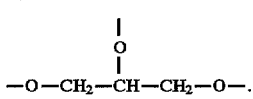

(d) x terminal fatty acid acyl groups, wherein x is zero or an integer of up to $$\frac{n}{2};$$

and (e) n-x terminal hydrogen atoms;

wherein n is an integer of from 2 to 8 and the aliphatic hydrocarbyl groups, short chain oxyalkylene units, and long chain oxyalkylene units are interconnected through ether linkages.

2. The fat component of claim 1 wherein n is 3.

3. The fat component of claim 1 wherein the aliphatic hydrocarbyl group is $$-O-CH_2-\overset{\overset{\displaystyle O}{|}}{\underset{|}{CH}}-CH_2-O-.$$

4. The fat component of claim 1 wherein one of $R^1$ or $R^2$ is hydrogen.

5. The fat component of claim 1 wherein x is at least 1.

6. The fat component of claim 1 wherein the alkoxylated alcohol comprises at least 25% by weight of said fat component.

7. The fat component of claim 1 wherein the edible triglyceride is selected from the group consisting of tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, fully or partially hydrogenated derivatives thereof and mixtures thereof.

8. An alkoxylated alcohol useful as a reduced calorie fat substitute comprised of (a) an aliphatic hydrocarbyl group bearing n pendant ether oxygen atoms wherein said aliphatic hydrocarbyl group is derived from an alcohol having n hydroxy groups;

(b) from n to 10 times n short chain oxyalkylene units having a structure

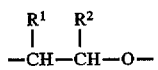

wherein $R^1$ and $R^2$ are the same or different and are selected from hydrogen, and $C_1$–$C_4$ alkyl, subject to the provision that each short chain oxyalkylene unit has a total of no more than 6 carbon atoms;

(c) from n-1 to 5 times n long chain oxyalkylene units having a structure

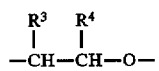

wherein one of $R^3$ or $R^4$ is hydrogen or $C_1$–$C_4$ alkyl and the remaining $R^3$ or $R^4$ is selected from $C_{10}$–$C_{22}$ alkyl and said long chain oxyalkylene units are derived from one or more long chain epoxides of structure

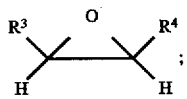

(d) x terminal fatty acid acyl groups, wherein x is an integer from 1 to

and (e) n-x terminal hydrogen atoms;

wherein n is an integer of from 2 to 8 and the aliphatic hydrocarbyl groups, short chain oxyalkylene units, and long chain oxyalkylene units are interconnected through ether linkages.

9. The alkoxylated alcohol of claim 8 wherein the terminal fatty acid acyl groups have a structure

wherein $R^5$ is a $C_5$–$C_{23}$ aliphatic moiety.

10. The alkoxylated alcohol of claim 8 wherein n=3 and x=1.

11. A reduced calorie food product comprised of at least one non-fat ingredient and a fat component, said fat component comprising an alkoxylated alcohol comprised of (a) an aliphatic hydrocarbyl group bearing n pendant ether oxygen atoms wherein said aliphatic hydrocarbyl group is derived from an alcohol having n hydroxy groups;

(b) from n to 10 times n short chain oxyalkylene units having a structure

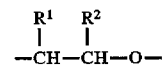

wherein $R^1$ and $R^2$ are the same or different and are selected from hydrogen and $C_1$–$C_4$ alkyl, subject to the provision that each short chain oxyalkylene unit has a total of no more than 6 carbon atoms;

(c) from n-1 to 5 times n long chain oxyalkylene units having a structure

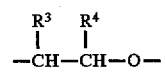

wherein one of $R^3$ or $R^4$ is hydrogen or $C_1$–$C_4$ alkyl and the remaining $R^3$ or $R^4$ is selected from $C_{10}$–$C_{22}$ alkyl and said long chain oxyalkylene units are derived from one or more long chain epoxides of structure

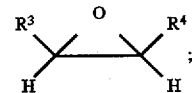

(d) x terminal fatty acid acyl groups, wherein x is zero or an integer of up to

and (e) n-x terminal hydrogen atoms;

wherein n is an integer of from 2 to 8 and the aliphatic hydrocarbyl groups, short chain oxyalkylene units, and long chain oxyalkylene units are interconnected through ether linkages.

12. The reduced calorie food product of claim 11 wherein the alkoxylated alcohol comprises at least 5% by weight of the reduced calorie food product.

13. The reduced calorie food product of claim 11 wherein the non-fat ingredient is selected from the group consisting of proteins, carbohydrates, vitamins, and mixtures thereof.

14. A method of reducing calories in a food product comprised of a fat component, where the method comprises replacing at least 25% by weight of the fat component with an alkoxylated alcohol comprised of (a) an aliphatic hydrocarbyl group bearing n pendant ether oxygen atoms wherein said aliphatic hydrocarbyl group is derived from an alcohol having n hydroxy groups;

(b) from n to 10 times n short chain oxyalkylene units having a structure

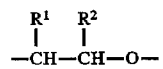

wherein $R^1$ and $R^2$ are the same or different and are selected from hydrogen and $C_1$–$C_4$ alkyl, subject to the provision that each short chain oxyalkylene unit has a total of no more than 6 carbon atoms;

(c) from n-1 to 5 times n long chain oxyalkylene units having a structure

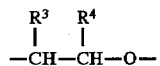

wherein one of $R^3$ or $R^4$ is hydrogen or $C_1$–$C_4$ alkyl and the remaining $R^3$ or $R^4$ is selected from $C_{10}$–$C_{22}$ alkyl and said long chain oxyalkylene units are derived from one or more long chain epoxides of structure

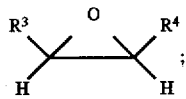

(d) x terminal fatty acid acyl groups, wherein x is zero or an integer of up to $$\frac{n}{2};$$

and (e) n-x terminal hydrogen atoms;

wherein n is an integer of from 2 to 8 and the aliphatic hydrocarbyl groups, short chain oxyalkylene units, and long chain oxyalkylene units are interconnected through ether linkages.

* * * * *